United States Patent
Alexander

(10) Patent No.: US 12,143,472 B2
(45) Date of Patent: Nov. 12, 2024

(54) SYSTEMS AND METHODS FOR SECURING COMMUNICATION CHANNELS FOR NEW USER ONBOARDING

(71) Applicant: JPMORGAN CHASE BANK, N.A., New York, NY (US)

(72) Inventor: Scott Alexander, Motherwell (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 293 days.

(21) Appl. No.: 17/814,111

(22) Filed: Jul. 21, 2022

(65) Prior Publication Data

US 2024/0031134 A1 Jan. 25, 2024

(51) Int. Cl.
*H04L 9/08* (2006.01)

(52) U.S. Cl.
CPC .......... *H04L 9/0825* (2013.01); *H04L 9/0866* (2013.01); *H04L 9/0869* (2013.01)

(58) Field of Classification Search
CPC .... H04L 9/0825; H04L 9/0866; H04L 9/0869
See application file for complete search history.

(56) References Cited

U.S. PATENT DOCUMENTS

| | | | | |
|---|---|---|---|---|
| 10,536,436 B1* | 1/2020 | Barbour | ............. | H04L 63/0838 |
| 11,539,685 B2* | 12/2022 | Simic | .................... | H04L 9/3263 |
| 2020/0100108 A1* | 3/2020 | Everson | ................ | H04L 9/0825 |
| 2020/0259656 A1* | 8/2020 | Sundaresan | ...... | G06Q 20/40145 |
| 2020/0374121 A1* | 11/2020 | Momchilov | .......... | H04L 9/0825 |
| 2021/0184841 A1* | 6/2021 | Shpurov | ............... | H04L 9/3263 |
| 2022/0150692 A1* | 5/2022 | O'Kane | ............... | G06Q 20/322 |
| 2022/0353060 A1* | 11/2022 | Saarnivala | ............. | H04W 4/70 |
| 2023/0376947 A1* | 11/2023 | Chayanam | ............. | H04L 63/08 |

* cited by examiner

*Primary Examiner* — Frantz B Jean

(74) *Attorney, Agent, or Firm* — GREENBERG TRAURIG LLP

(57) ABSTRACT

Systems and methods for securing communication channels for new user onboarding are disclosed. According to one embodiment, a method may include an onboarding application executed on a new user mobile electronic device: generating a new user cryptographic key pair using secure hardware on the new user mobile electronic device; protecting a new user private key of the new user cryptographic key pair with a new user biometric or passcode and storing the protected new user private key on the new user mobile electronic device; communicating new user information and a new user public key of the new user cryptographic key pair to a backend computer program for an organization; receiving encrypted new user credentials from the backend computer program; retrieving the protected new user private key and unlocking the new user protected private key using the new user biometric or passcode; and decrypting the encrypted new user credentials.

20 Claims, 2 Drawing Sheets

SYSTEMS AND METHODS FOR SECURING COMMUNICATION CHANNELS FOR NEW USER ONBOARDING

BACKGROUND OF THE INVENTION

1. Field of the Invention

Embodiments relate generally to systems and methods for securing communication channels for new user onboarding.

2. Description of the Related Art

Mobile phones are increasingly being used as a mechanism in authentication flows. For example, mobile phones may be used to receive a one-time passcode via Short Messaging Service (SMS) or push notification, or to receive a request to approve a transaction from a web application. When these devices are set up as a second factor authentication device, the user typically enters a username and password, and then a one-time passcode is provided by SMS or email. The one-time passcode, however, is not sent over a secure channel. This lack of secure communication could lead to the one-time passcode being compromised, which weakens the security of the device as an authentication factor.

SUMMARY OF THE INVENTION

Systems and methods for securing communication channels for new user onboarding are disclosed. According to one embodiment, a method for securing communication channels for new user onboarding may include: (1) generating, by an onboarding application executed on a new user mobile electronic device, a new user cryptographic key pair using secure hardware on the new user mobile electronic device; (2) protecting, by the onboarding application, a new user private key of the new user cryptographic key pair with a new user biometric or passcode and storing the protected new user private key on the new user mobile electronic device; (3) communicating, by the onboarding application, new user information and a new user public key of the new user cryptographic key pair to a backend computer program for an organization; (4) receiving, by the onboarding application, encrypted new user credentials from the backend computer program; (5) retrieving, by the onboarding application, the protected new user private key and unlocking the new user protected private key using the new user biometric or passcode; and (6) decrypting, by the onboarding application, the encrypted new user credentials.

In one embodiment, the new user credentials may be encrypted with the new user public key, and the onboarding application decrypts the encrypted new user credentials using the new user private key.

In one embodiment, the new user credentials may be encrypted with an Advanced Encryption Standard (AES) key, the onboarding application further receives the AES key that is encrypted with the new user public key, and the onboarding application decrypts the AES key using the new user private key and then decrypts the new user credentials with the AES key.

In one embodiment, the new user may include an individual, a client, or a vendor.

In one embodiment, the method may also include receiving, by the onboarding application, a unique onboarding identifier generated by the backend computer program from the backend computer program; and communicating, by the onboarding application, additional new user information and the unique onboarding identifier to the backend computer program.

In one embodiment, the encrypted new user credentials may be received in an email. The email may include a link to launch the onboarding application upon receipt of the new user biometric or passcode.

In one embodiment, the method may also include receiving, by the onboarding application, encrypted additional information; retrieving, by the onboarding application, the protected new user private key and unlocking the protected new user private key using the new user biometric or passcode; decrypting, by the onboarding application, the encrypted additional information; and providing, by the onboarding application, the additional information to a second application. The additional information may include a seed for an authenticator application, and the second application comprises the authenticator application.

According to another embodiment, a method for securing communication channels for onboarding a new user may include: (1) receiving, by a backend computer program executed by a backend electronic device and from an onboarding application executed by a new user mobile electronic device, new user information and a new user public key of a new user cryptographic key pair; (2) confirming, by the backend computer program, an identity for the new user using the new information; (3) generating, by the backend computer program, new user credentials for the new user; (4) encrypting, by the backend computer program, the new user credentials and communicating the new user credentials to the onboarding application, wherein the onboarding application is configured to decrypt the new user credentials; and (5) encrypting, by the backend computer program, a seed for an authenticator application executed by the new user mobile electronic device, wherein the onboarding application is configured to decrypt the seed and provide the seed to the authenticator application.

In one embodiment, the new user credentials may be encrypted with the new user public key, and the onboarding application is configured to decrypt the encrypted user credentials using a new user private key associated with the new user public key.

In one embodiment, the new user credentials are encrypted with an Advanced Encryption Standard (AES) key, and the onboarding application is configured to receive the AES key that is encrypted with the new user public key, decrypt the AES key using a new user private key, and decrypt the new user credentials with the AES key.

In one embodiment, the new user may include an individual, a client, or a vendor.

In one embodiment, the method may also include generating, by the backend computer program, a unique onboarding identifier; and communicating, by the backend computer program the unique onboarding identifier to the onboarding application.

In one embodiment, the encrypted new user credentials may be communicated in an email, and the email may include a link to launch the onboarding application upon receipt of a new user biometric or passcode.

According to another embodiment, a non-transitory computer readable storage medium may include instructions stored thereon, which when read and executed by one or more computer processors, cause the one or more computer processors to perform steps comprising: generate a new user cryptographic key pair using secure hardware; protect a new user private key of the new user cryptographic key pair with a new user biometric or passcode and storing the protected new user private key; communicate new user information and a new user public key of the new user cryptographic key pair to a backend computer program for an organization; receive encrypted new user credentials from the backend computer program; retrieve the protected new user private key and unlocking the new user protected private key using the new user biometric or passcode; and decrypt the encrypted new user credentials.

In one embodiment, the new user credentials may be encrypted with the new user public key, and the non-transitory computer readable storage may also instructions stored thereon, which when read and executed by one or more computer processors, cause the one or more computer processors to decrypt the encrypted new user credentials using the new user private key, or the new user credentials may be encrypted with an Advanced Encryption Standard (AES) key, and the non-transitory computer readable storage medium may also include instructions stored thereon, which when read and executed by one or more computer processors, cause the one or more computer processors to receive the AES key that is encrypted with the new user public key, decrypt the AES key using the new user private key, and decrypt the new user credentials with the AES key.

In one embodiment, the non-transitory computer readable storage medium may also include instructions stored thereon, which when read and executed by one or more computer processors, cause the one or more computer processors to: receive a unique onboarding identifier generated by the backend computer program from the backend computer program; and communicate additional new user information and the unique onboarding identifier to the backend computer program.

In one embodiment, the non-transitory computer readable storage medium may also include instructions stored thereon, which when read and executed by one or more computer processors, cause the one or more computer processors to: receive encrypted additional information comprising a seed to an authenticator application; retrieve the protected new user private key and unlock the protected new user private key using the new user biometric or passcode; decrypt the encrypted additional information; and provide the additional information to the authenticator application.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments relate generally to systems and methods for securing communication channels for new user onboarding.

Embodiments provide a method for encrypting content sent from a company or organization to a new user's mobile electronic device during, for example, an onboarding process, so that only the new user can decrypt the content only on the new user's mobile electronic device. For example, the new user may install an application that may generate cryptographic keys necessary to secure communications between a host backend (e.g., a backend for a company or organization) and the new user's mobile electronic device. The application may request details for the user new user, such as the new user's name, address, etc. The application may then leverage hardware elements on the new user's mobile electronic device (e.g., Secure Enclave on iOS devices or Trusted Execution Environment on Android devices) to generate an asymmetric key pair. The generated keys may be protected with, for example, biometrics or a passcode, and may only be recovered by those biometrics or passcode. The public key and the new user entered details may be communicated to the backend and stored, and the backend may send the application a unique string, such as an onboarding identifier, that may uniquely identify the information received from the application.

As part of the new user's onboarding, the user will provide the onboarding identifier with communications from the new user's mobile electronic device. Once the new user has been confirmed (e.g., the new user's identity is confirmed as part of a know your customer screening), the backend may generate credentials for the new user (e.g., a username and password) and may encrypt the credentials with the new user's public key associated with the onboarding identifier. The encrypted user credentials may be communicated to the new user's mobile electronic device, and the application may use the new user's biometrics or passcode to retrieve the new user's private key, decrypt the encrypted user credentials with the new user's private key, and display the new user's credentials for the new user. The new user may then use the new user credentials to access the backend and other protected systems for the organization or company.

The new user may be an employee, a client, a vendor, etc.

Figure 1:
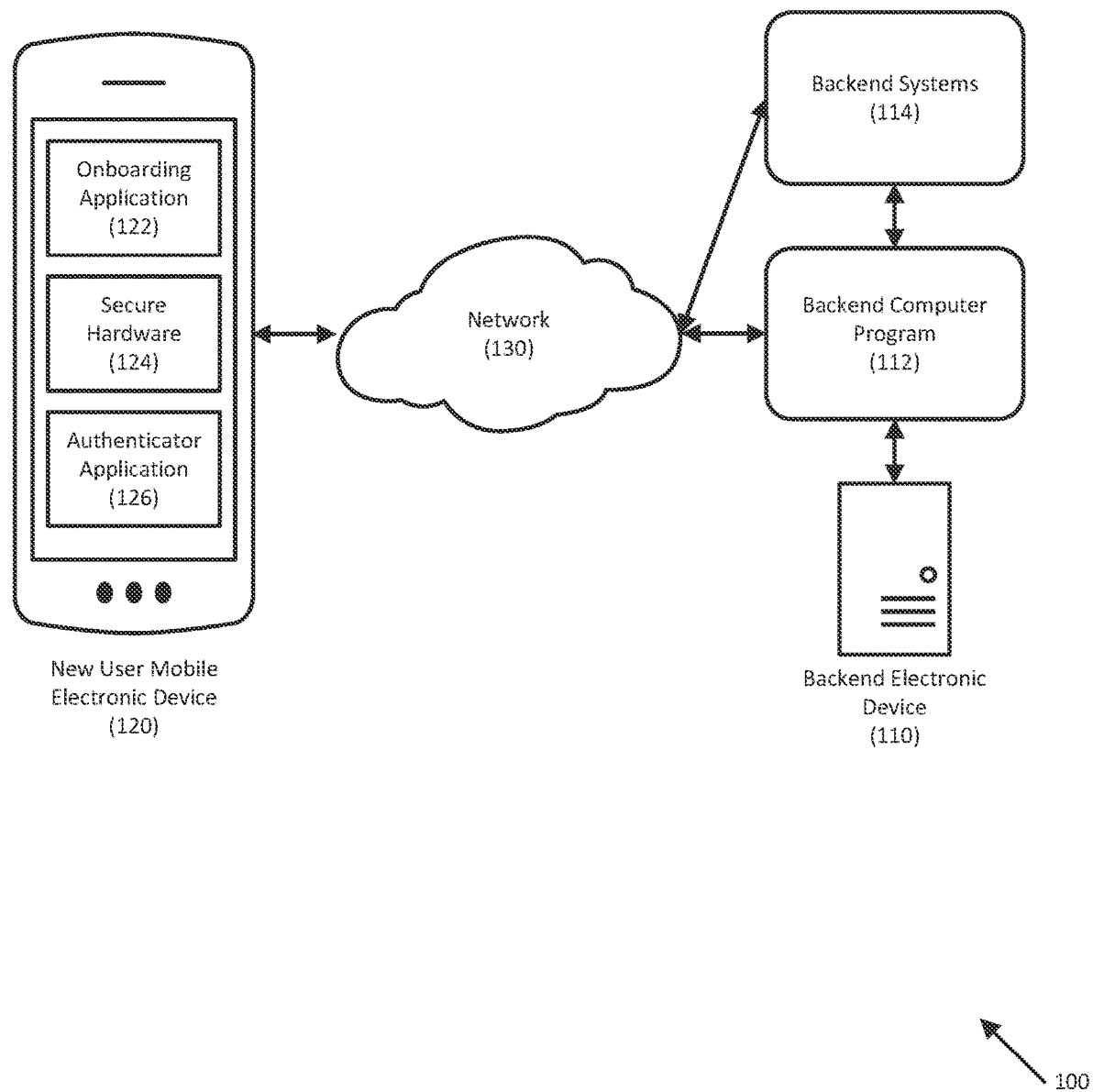
FIG. 1 depicts a system for securing communication channels for new user onboarding according to an embodiment.

Referring to FIG. 1, a system for securing communication channels for new user onboarding is disclosed according to an embodiment. System 100 may include backend electronic device 110 for a host (e.g., an organization, employer, etc.) that may be any suitable electronic device, including servers (cloud and/or physical), etc. Backend electronic device 110 may execute backend computer program 112 that may communicate, via network 130, with onboarding application 122 executed by new user mobile electronic device 120. New user mobile electronic device 120 may be any suitable electronic device, including smartphones, tablet computers, notebook computer, desktop computers, etc.

New user mobile electronic device 120 may include secure hardware 124. Examples of secure hardware include the Secure Enclave on iOS devices, or the Trusted Execution Environment on Android devices. Secure hardware 124 may generate a cryptographic key pair for the user and may store the new user private key in secure storage. The new user private key may be protected with a biometric, a passcode, etc.

New user mobile electronic device 120 may also include authenticator application 126 which may be provided with information, such as a seed, so that it can be used to authenticate the new user to backend computer program 112. For example, authenticator application 126 may generate a code that the new user may provide to backend electronic device 110, or may communicate authentication to backend electronic device 110 after receiving a code, password, biometric, etc. from the new user, etc.

Once the new user has the credentials, the user new user may use them to access, for example, backend system 114 for the organization, such as applications, databases, virtual desktops, etc.

Figure 2:
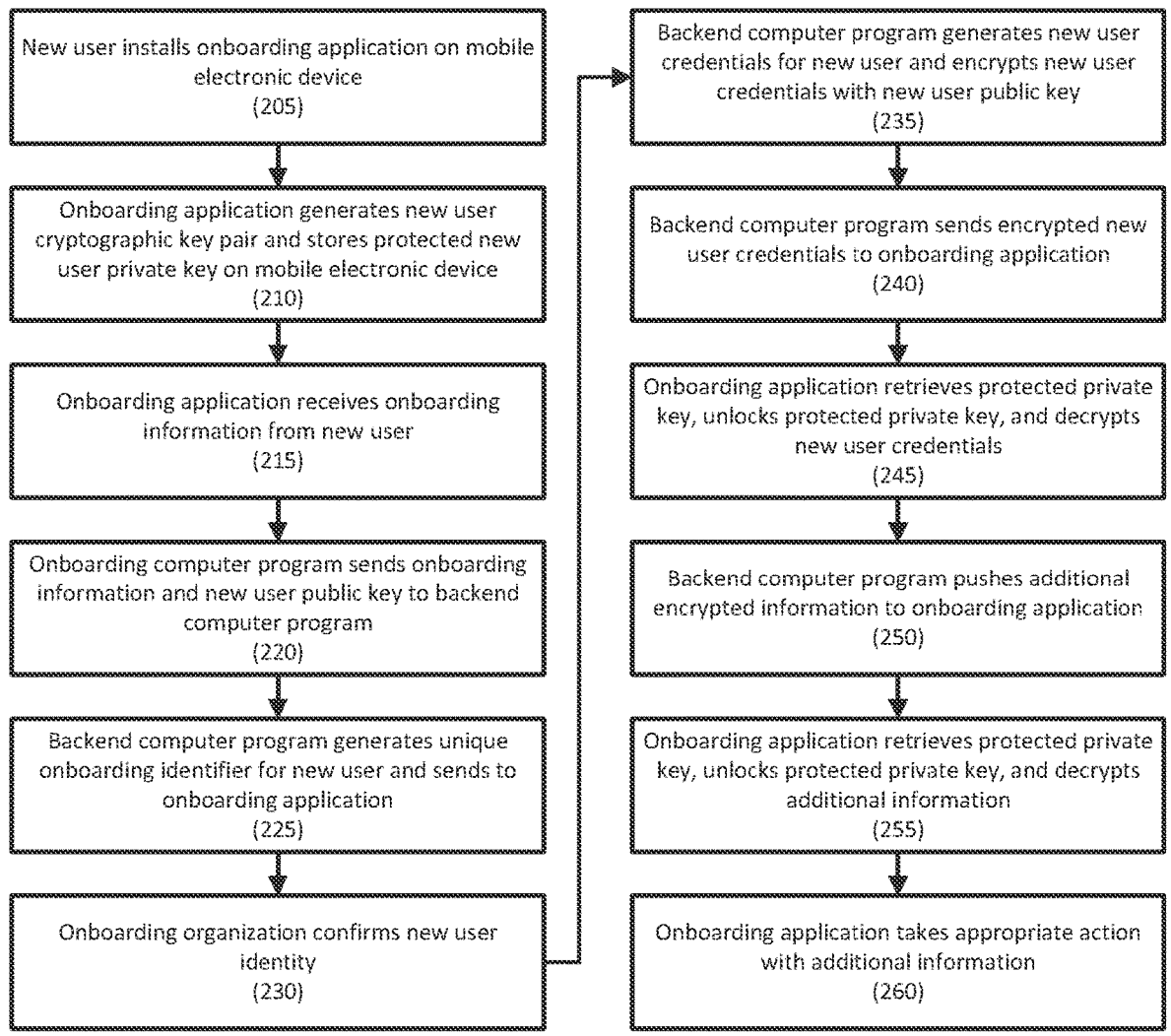
FIG. 2 depicts a method for securing communication channels for new user onboarding according to an embodiment.

Referring to FIG. 2, a method for securing communication channels for new user onboarding is disclosed according to an embodiment.

In step 205, a new user may install an onboarding application on the new user's mobile electronic device. In one embodiment, the onboarding application may be associated with an organization to which the new user is being onboarded, such as an employer.

In step 210, the onboarding application may generate a new user cryptographic key pair using secure hardware on the new user mobile electronic device. The onboarding application may protect the new user private key with, for example, a biometric, a passcode, etc. and may store the protected new user private key on the mobile electronic device.

In step 215, as part of the onboarding process, the onboarding application may receive onboarding information from the new user. For example, the onboarding application may receive the new user's name, address, and other contact information as is necessary and/or desired.

In step 220, the onboarding computer program may send the onboarding information and the new user public key to a backend computer program for the organization with which the new user is being onboarded.

In step 225, the backend computer program may receive the new user public key and onboarding information and may generate a unique onboarding identifier for the new user. The backend computer program may send the unique onboarding identifier to the onboarding application. The backend computer program may also associate the new user public key with the unique onboarding identifier and store the new user public key.

In step 230, the onboarding organization may confirm the new user's identity using any suitable process. Once the organization is satisfied, in step 235, the backend computer program may generate new user credentials for new user (e.g., username and password) and may encrypt the new user credentials with the new user public key.

In one embodiment, hybrid encryption may be used. For example, the new user credentials may be encrypted with a unique Advanced Encryption Standard (AES) key, and then the AES key may be encrypted with the new user public key.

In step 240, the backend computer program may send the encrypted new user credentials and, if hybrid encryption is used, the encrypted AES key, to the onboarding application, and in step 245, the onboarding application may retrieve the protected private key, unlock protected private key using, for example, the biometrics or passcode, and may decrypt the new user credentials.

In one embodiment, the encrypted new user credentials may be sent by email, by push messaging, etc. In one embodiment, the message including the encrypted new user credentials may include a link to launch the onboarding application upon providing the information to unlock the protected private key, such as biometrics, a passcode, etc.

In step 250, the backend computer program may push additional encrypted information to the onboarding application. For example, the backend computer program may push a seed for an authenticator application to the onboarding application.

In step 255, the onboarding application may retrieve the protected private key, may unlock the protected private key with, for example, the new user's biometrics, passcode, etc., and may decrypt the additional information. In step 260, the onboarding application may then take an appropriate action with the additional information, such as providing the seed to the authenticator application.

Although multiple embodiments have been described, it should be recognized that these embodiments are not exclusive to each other, and that features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for securing communication channels for onboarding a new user, comprising:
    generating, by an onboarding application executed on a new user mobile electronic device, a new user cryptographic key pair using secure hardware on the new user mobile electronic device;
    protecting, by the onboarding application, a new user private key of the new user cryptographic key pair with a new user biometric or passcode and storing the protected new user private key on the new user mobile electronic device;
    communicating, by the onboarding application, new user information and a new user public key of the new user cryptographic key pair to a backend computer program for an organization;
    receiving, by the onboarding application, encrypted new user credentials from the backend computer program;
    retrieving, by the onboarding application, the protected new user private key and unlocking the new user protected private key using the new user biometric or passcode; and
    decrypting, by the onboarding application, the encrypted new user credentials.

2. The method of claim 1, wherein the new user credentials are encrypted with the new user public key, and the onboarding application decrypts the encrypted new user credentials using the new user private key.

3. The method of claim 1, wherein the new user credentials are encrypted with an Advanced Encryption Standard (AES) key, the onboarding application further receives the AES key that is encrypted with the new user public key, and the onboarding application decrypts the AES key using the new user private key and then decrypts the new user credentials with the AES key.

4. The method of claim 1, wherein the new user comprises an individual, a client, or a vendor.

5. The method of claim 1, further comprising:
    receiving, by the onboarding application, a unique onboarding identifier generated by the backend computer program from the backend computer program; and
    communicating, by the onboarding application, additional new user information and the unique onboarding identifier to the backend computer program.

6. The method of claim 1, wherein the encrypted new user credentials are received in an email.

7. The method of claim 6, wherein the email comprises a link to launch the onboarding application upon receipt of the new user biometric or passcode.

8. The method of claim 1, further comprising:
    receiving, by the onboarding application, encrypted additional information;
    retrieving, by the onboarding application, the protected new user private key and unlocking the protected new user private key using the new user biometric or passcode;
    decrypting, by the onboarding application, the encrypted additional information; and
    providing, by the onboarding application, the additional information to a second application.

9. The method of claim 8, wherein the additional information comprises a seed for an authenticator application, and the second application comprises the authenticator application.

10. A method for securing communication channels for onboarding a new user, comprising:
    receiving, by a backend computer program executed by a backend electronic device and from an onboarding application executed by a new user mobile electronic device, new user information and a new user public key of a new user cryptographic key pair;
    confirming, by the backend computer program, an identity for the new user using the new information;
    generating, by the backend computer program, new user credentials for the new user;
    encrypting, by the backend computer program, the new user credentials and communicating the new user credentials to the onboarding application, wherein the onboarding application is configured to decrypt the new user credentials; and
    encrypting, by the backend computer program, a seed for an authenticator application executed by the new user mobile electronic device, wherein the onboarding application is configured to decrypt the seed and provide the seed to the authenticator application.

11. The method of claim 10, wherein the new user credentials are encrypted with the new user public key, and the onboarding application is configured to decrypt the encrypted user credentials using a new user private key associated with the new user public key.

12. The method of claim 10, wherein the new user credentials are encrypted with an Advanced Encryption Standard (AES) key, and the onboarding application is configured to receive the AES key that is encrypted with the new user public key, decrypt the AES key using a new user private key, and decrypt the new user credentials with the AES key.

13. The method of claim 10, wherein the new user comprises an individual, a client, or a vendor.

14. The method of claim 10, further comprising:
    generating, by the backend computer program, a unique onboarding identifier; and
    communicating, by the backend computer program the unique onboarding identifier to the onboarding application.

15. The method of claim 10, wherein the encrypted new user credentials are communicated in an email.

16. The method of claim 15, wherein the email comprises a link to launch the onboarding application upon receipt of a new user biometric or passcode.

17. A non-transitory computer readable storage medium, including instructions stored thereon, which when read and executed by one or more computer processors, cause the one or more computer processors to perform steps comprising:
    generate a new user cryptographic key pair using secure hardware;
    protect a new user private key of the new user cryptographic key pair with a new user biometric or passcode and storing the protected new user private key;

communicate new user information and a new user public key of the new user cryptographic key pair to a backend computer program for an organization;

receive encrypted new user credentials from the backend computer program;

retrieve the protected new user private key and unlocking the new user protected private key using the new user biometric or passcode; and decrypt the encrypted new user credentials.

18. The non-transitory computer readable storage medium of claim 17, wherein the new user credentials are encrypted with the new user public key, and the non-transitory computer readable further comprises instructions stored thereon, which when read and executed by one or more computer processors, cause the one or more computer processors to decrypt the encrypted new user credentials using the new user private key, or the new user credentials are encrypted with an Advanced Encryption Standard (AES) key, and the non-transitory computer readable storage medium comprises instructions stored thereon, which when read and executed by one or more computer processors, cause the one or more computer processors to receive the AES key that is encrypted with the new user public key, decrypt the AES key using the new user private key, and decrypt the new user credentials with the AES key.

19. The non-transitory computer readable storage medium of claim 17, further comprising instructions stored thereon, which when read and executed by one or more computer processors, cause the one or more computer processors to perform steps comprising:

receive a unique onboarding identifier generated by the backend computer program from the backend computer program; and communicate additional new user information and the unique onboarding identifier to the backend computer program.

20. The non-transitory computer readable storage medium of claim 17, further comprising instructions stored thereon, which when read and executed by one or more computer processors, cause the one or more computer processors to perform steps comprising:

receive encrypted additional information comprising a seed to an authenticator application;

retrieve the protected new user private key and unlock the protected new user private key using the new user biometric or passcode;

decrypt the encrypted additional information; and provide the additional information to the authenticator application.

* * * * *